(12) United States Patent
Ameziani et al.

(10) Patent No.: US 9,484,762 B2
(45) Date of Patent: Nov. 1, 2016

(54) DEVICE AND METHOD FOR BALANCING BATTERY CELLS

(75) Inventors: Menouar Ameziani, Guyancourt (FR); Jeanne Houivet, Paris (FR)

(73) Assignee: RENAULT s.a.s., Boulogne Billancourt (FR)

( * ) Notice: Subject to any disclaimer, the term of this patent is extended or adjusted under 35 U.S.C. 154(b) by 258 days.

(21) Appl. No.: 14/111,418

(22) PCT Filed: Apr. 11, 2012

(86) PCT No.: PCT/FR2012/050786
§ 371 (c)(1),
(2), (4) Date: Dec. 20, 2013

(87) PCT Pub. No.: WO2012/140363
PCT Pub. Date: Oct. 18, 2012

(65) Prior Publication Data
US 2014/0117935 A1    May 1, 2014

(30) Foreign Application Priority Data

Apr. 11, 2011    (FR) ...................................... 11 53132

(51) Int. Cl.
*H02J 7/00*    (2006.01)
*H02J 7/04*    (2006.01)
*H02M 3/335*    (2006.01)

(52) U.S. Cl.
CPC ............ *H02J 7/0068* (2013.01); *H02J 7/0016* (2013.01); *H02J 7/0018* (2013.01); *H02J 2007/0059* (2013.01); *H02M 3/33561* (2013.01); *Y02T 10/7055* (2013.01)

(58) Field of Classification Search
CPC .................................................. H02J 7/0068
USPC ................. 320/118, 141, 145, 116, 122, 140
See application file for complete search history.

(56) References Cited

U.S. PATENT DOCUMENTS

| | | | | |
|---|---|---|---|---|
| 6,388,424 B1 * | 5/2002 | Hidaka | ................. | H02J 7/0016 320/122 |
| 7,804,276 B2 * | 9/2010 | Roessler | ....................... | 320/118 |
| 7,880,433 B2 * | 2/2011 | Oh | ........................ | H02J 7/0016 320/118 |
| 8,330,418 B2 * | 12/2012 | Furukawa | ............. | H02J 7/0018 320/118 |
| 9,142,987 B2 * | 9/2015 | Gollob | ................ | B60L 11/1866 |
| 9,209,630 B2 * | 12/2015 | Naghshtabrizi | ....... | H02J 7/0016 |
| 2008/0272735 A1 | 11/2008 | Roessler | | |

(Continued)

FOREIGN PATENT DOCUMENTS

WO    WO 2008/097033 A1    8/2008

OTHER PUBLICATIONS

International Search Report issued Sep. 17, 2012 in PCT/FR2012/050786.

(Continued)

*Primary Examiner* — Richard V Muralidar

(74) *Attorney, Agent, or Firm* — Oblon, McClelland, Maier & Neustadt, L.L.P.

(57) ABSTRACT

A device and method for balancing cells of a battery of an electric automobile, the device including: a primary winding arranged in series with a primary switch; and, for each cell, a circuit including, in series, a secondary winding that forms a transformer together with the primary winding, a secondary switch, a coil, and a diode mounted in parallel with the coil and the cell; and a controller controlling the primary switch and each secondary switch.

8 Claims, 3 Drawing Sheets

(56) References Cited

U.S. PATENT DOCUMENTS

| | | |
|---|---|---|
| 2010/0007308 A1 | 1/2010 | Lee et al. |
| 2011/0012559 A1 | 1/2011 | Roessler |
| 2011/0155494 A1* | 6/2011 | Haas .................. B60L 11/1801 180/206.1 |

OTHER PUBLICATIONS

Ray Ridley, "The Nine Most Useful Power Topologies" Power Systems Design Europe, XP002486528, Oct. 1, 2007, pp. 15-18 http://www.powersystemsdesign.com/design_tips_oct07.pdf.

* cited by examiner

DEVICE AND METHOD FOR BALANCING BATTERY CELLS

The invention concerns electric or hybrid traction automobile vehicles and more precisely the batteries of these vehicles.

The batteries of electric or hybrid traction automobile vehicles generally comprise a plurality of cells disposed in series. When a battery supplies power to an electric motor, or when this battery is charged, the voltage at the terminals of each cell is modified. The modification of the voltage at the terminals of each cell can vary, causing voltage imbalances between the cells to appear. These voltage imbalances correspond to imbalances of the state of charge (SOC) between the cells. Some cells can therefore be charged or discharged completely before the other cells, and run the risk of deteriorating. Charging of the battery is stopped as soon as at least one cell is charged completely; the battery is discharged as soon as at least one cell is discharged completely; the imbalances therefore limit the use of the battery.

It is therefore necessary to balance the voltage at the terminals of each cell of the battery or the state of charge of each cell of the battery. To this end, it has been proposed to discharge the overcharged cells into resistances. The balancing obtained by such a method is obtained after too long a time compared to the time it takes to charge an electric vehicle battery and this method has the disadvantage of generating energy losses.

It has also been proposed to implement active balancing of the cells of a battery by transferring energy from the overcharged cells to the least charged cells.

Reference may be made to American patent application US 2008/0272735 which describes the use of a flyback topology switching mode power supply circuit utilizing a transformer with a plurality of secondary windings to balance the voltages at the terminals of the cells. This solution has the disadvantage of being costly and of emitting electromagnetic interference, and the currents generated to charge and to discharge the cells can damage them.

Reference may also be made to the application WO 2004/049540 which describes the use of a single DC-DC converter and a semiconductor switching matrix for cell selection. This switching matrix has the disadvantage of being costly.

Finally, it has been proposed in American patent application US 2005/00 17682 to use a DC-DC converter for each cell. The use of a converter for each cell has the disadvantage of being costly.

An object of the invention is to improve the balancing of cells of a battery, by balancing the voltages at the terminals of these cells, or by balancing their respective states of charge, and notably to reduce the cost thereof.

In accordance with one aspect, there is proposed a device for balancing cells of a battery of an electric traction automobile vehicle, the device comprising a primary winding disposed in series with a primary switch and for each cell a circuit comprising in series a secondary winding forming a transformer with the primary winding, a secondary switch, a coil and a diode mounted in parallel with the coil and the cell, and control means of the primary switch and each secondary switch.

There is obtained in this way a device utilizing a single primary winding for a plurality of secondary windings, capable of balancing the voltage at the terminals of the cells of a battery, or the states of charge of these cells. The use of a single transformer with a plurality of secondaries also makes it possible to reduce the cost of the device.

It will be noted that the device makes it possible to balance the state of charge of the cells of a battery of an electric traction automobile vehicle.

The control means are advantageously adapted to generate pulse width modulation signals intended for the primary switch and for the secondary switches.

The device may comprise a filter circuit comprising a capacitor, a coil and a diode, the filter circuit being intended to be disposed in series between the battery and the primary winding.

This filter circuit makes it possible to filter the harmonics linked to the signals generated by the switch control means, notably the pulse width modulation signals.

The primary switch and the secondary switches are advantageously MOSFETs.

Alternatively, the secondary switches comprise two MOSFETs in anti-parallel.

Thus the device uses only a small number of MOSFETs, which makes it possible to reduce the cost of the device.

In accordance with another aspect there is proposed a method of balancing cells of a battery of an electric traction automobile vehicle by means of a device comprising a primary winding disposed in series with a primary switch and for each cell a circuit comprising in series a secondary winding forming a transformer with the primary winding, a secondary switch, a coil and a diode mounted in parallel with the coil and the cell, said method comprising generation of a pulse width modulation signal intended for the primary switch or for at least one secondary switch.

This method also makes it possible to balance the voltages at the terminals of the cells of the battery or the state of charge of the cells of the battery of an electric traction automobile vehicle.

Advantageously a pulse width modulation signal intended for the primary switch is generated and the secondary switch of at least one cell to be charged is closed.

Alternatively a pulse width modulation signal is generated intended for the secondary switch of at least one cell to be discharged.

Other advantages and features of the invention will become apparent in the light of the following description given by way of nonlimiting example and illustrated by the appended drawings, in which.

Figure 1:
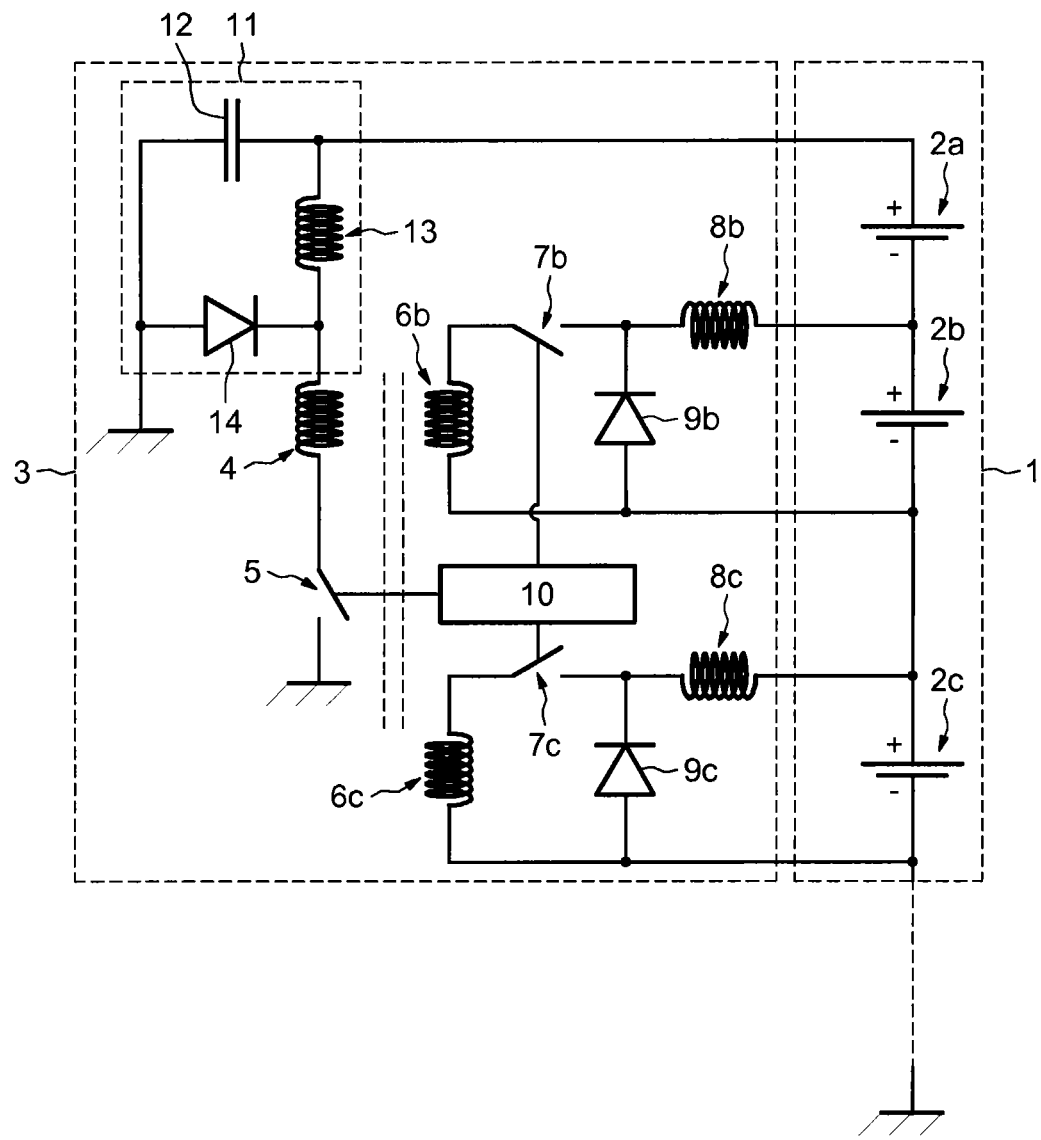
FIG. 1 shows a device in accordance with one embodiment of the invention.

In FIG. 1 there is represented a battery 1 of an electric or hybrid traction automobile vehicle.

The battery 1 conventionally comprises a plurality of cells 2a, 2b, 2c connected in series, here three in number. Of course, the battery 1 may comprise a greater number of cells, which have not been represented here for simplicity.

A device 3 for balancing the voltage at the terminals of the cells 2a, 2b, 2c is connected to the terminals of the cells. This device can also be utilized to balance the states of charge of the cells, the state of charge of a cell notably depending on the voltage of that cell.

The balancing device 3 comprises a primary winding 4 disposed in series with a primary switch 5. For each cell of the battery 1 a secondary winding forms a transformer with the primary winding 4. Notably represented are the secondary windings 6b and 6c of the cells 2b and 2c; the cell 2a and the other cells not represented here also include such a secondary winding, and the circuit described hereinafter.

The secondary windings 6b and 6c are disposed in a circuit also comprising in series with the secondary windings secondary switches 7b and 7c, coils 8b and 8c and finally the cells 2b and 2c. Diodes 9b and 9c are respectively mounted in parallel with the coil 8b and the cell 2b and with the coil 8c and the cell 2c.

There is therefore obtained for each cell a topology commonly referred to as a forward topology but one that uses a primary winding common to each cell.

The primary switch 5 and the secondary switches are controlled by control means 10. The control means 10 are capable of generating pulse width modulation signals or DC signals intended to close a switch.

Furthermore, a filter circuit 11 comprising in parallel a capacitor 12, a coil 13 and a diode 14 is disposed in series between the first cell 2a of the battery 1 and the primary winding 4. The harmonics generated for example by the control means 10 when generating pulse width modulation signals for controlling the switches are therefore filtered by the filter circuit 11.

The balancing device 3 may also comprise means for measuring the voltage at the terminals of the cells of the battery 1. These measuring means are for example connected to the control means 10 and make it possible to determine if the cells are overcharged or discharged.

For example, charging of the cell 2b includes generation by the control means 10 of a pulse width modulation signal intended for the primary switch 5. During this step, the control means 10 close the secondary switch 7b. When the pulse width modulation signal closes the primary switch 5 the current passes through the secondary switch 7b to the secondary winding 6b. The coil 8b is therefore charged. When the pulse width modulation signal opens the primary switch 5 the energy stored in the coil 8b is transferred to the cell 2b, the current flowing through the diode 9b. The diode 9b is a so-called free-wheel diode.

Charging of the cell 2b is effected when the voltage at the terminals of the cell 2b is too low, i.e. when the state of charge of this cell is too low, and in particular when other cells are overcharged and can supply power to this cell.

For example, if the cell 2c is overcharged, then charging of the cell 2b is accompanied by discharging of the cell 2c. During this discharging, the control means 10 generate a pulse width modulation signal fed to the secondary switch 7c and close the primary switch 5. When the pulse width modulation signal closes the secondary switch 7c the energy stored in the coil 8c the signal is transferred to the transformer consisting of the secondary winding 6c and the primary winding 4.

Efficacious balancing is obtained in this way, the efficiency of which depends on the windings of each circuit and on the pulse width modulation.

Furthermore, the use of a forward topology makes it possible to obtain rapid balancing of the voltage at the terminals of the cells of the battery 1.

Figure 2:
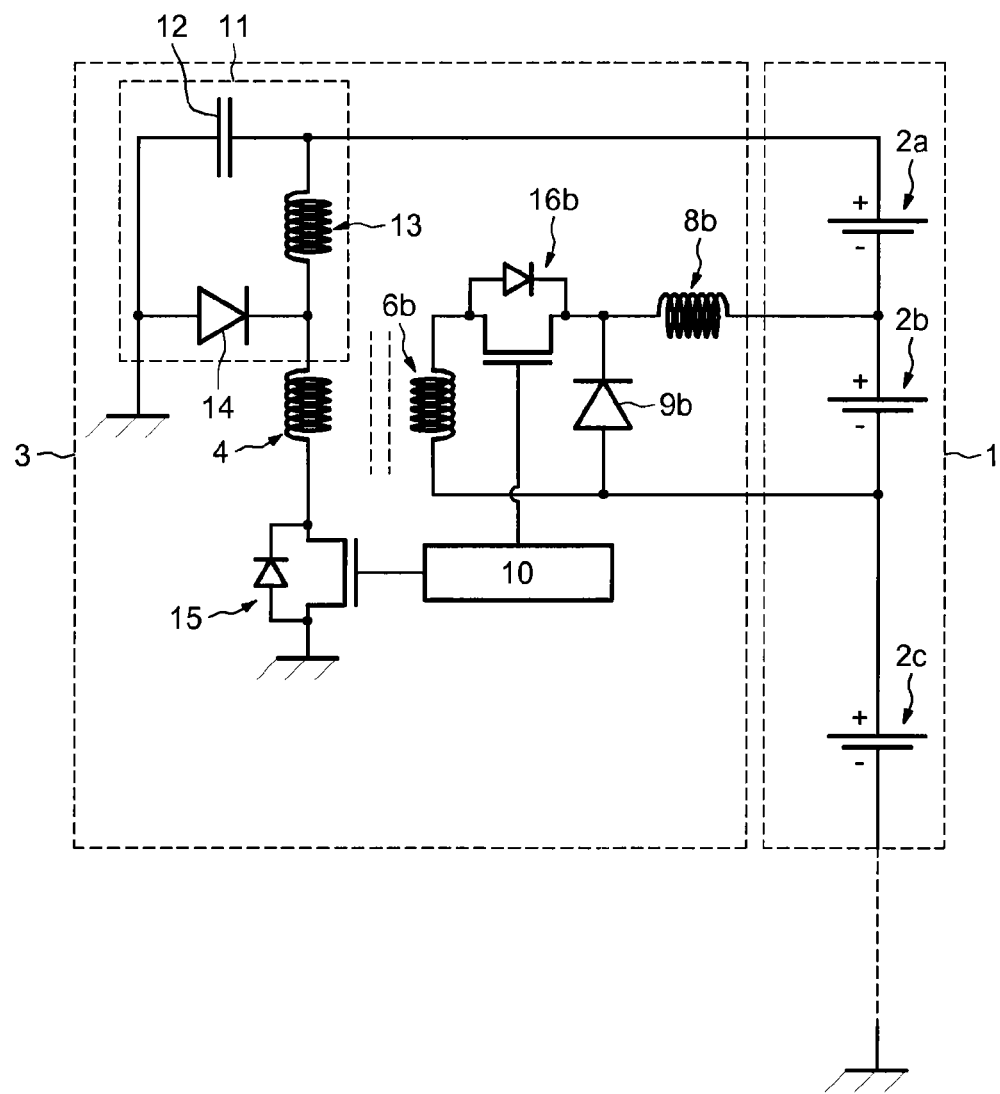
FIG. 2 shows a device in accordance with a second embodiment of the invention in which the switches are MOSFETs.

In FIG. 2 there is represented a second embodiment of the invention in which the primary switch 4 has been replaced by a MOSFET 15. The secondary switches have been replaced by MOSFETs, a MOSFET 16b replacing the switch 7b, for example.

Figure 3:
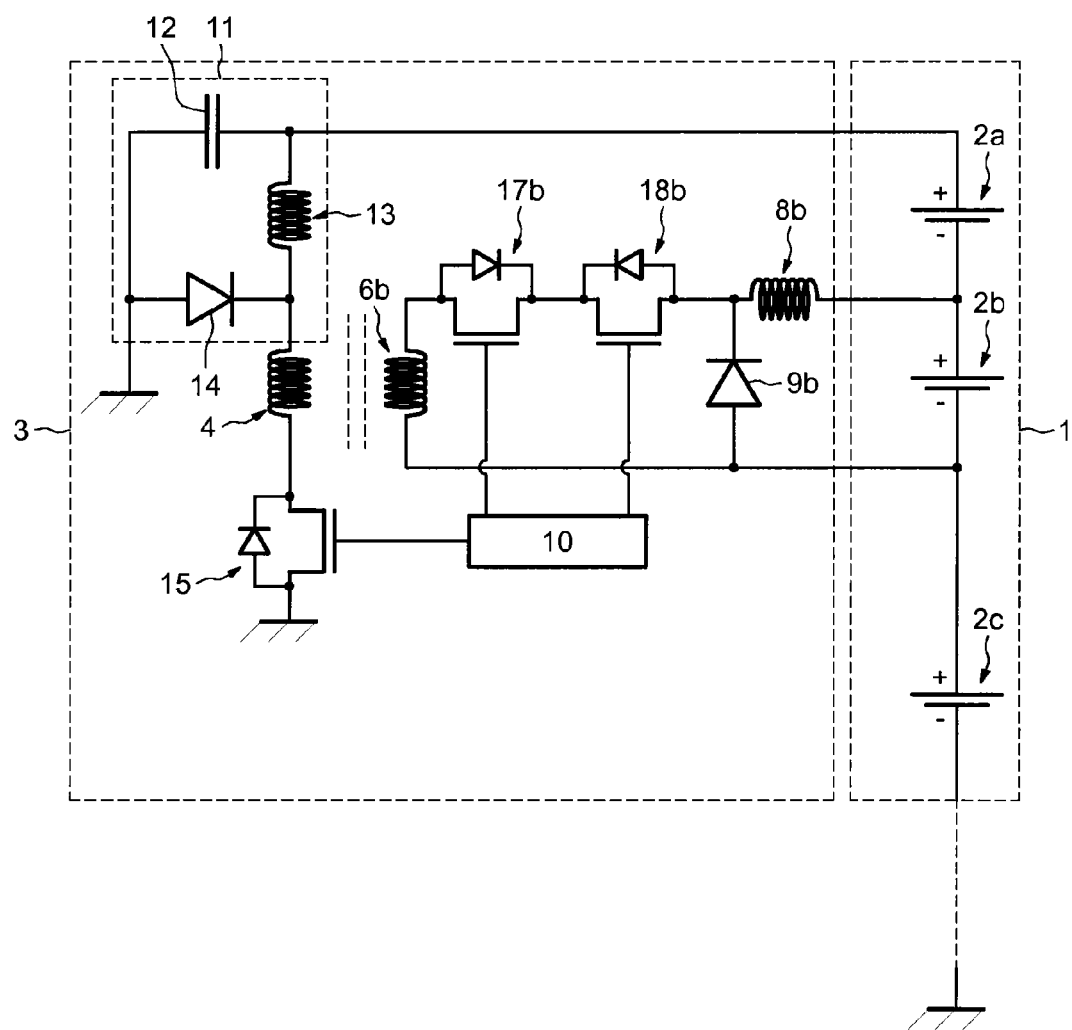
FIG. 3 shows a device in accordance with a third embodiment of the invention in which the secondary switches comprise two MOSFETs.

In FIG. 3 there is represented a third embodiment of the invention in which the MOSFET 16b has been replaced by two MOSFETs 17b and 18b. The two MOSFETs 17b and 18b are connected in anti-parallel.

In this embodiment control of either transistor by means of a pulse width modulation signal enables passage of the current in one direction or the other, i.e. charging or discharging of the cell. This embodiment also makes it possible to select the cell to be charged independently of the voltage levels of the other cells and improves the balancing of the voltage at the terminals of the batteries.

Thanks to the invention, active balancing of the voltage at the terminals of the cells of a battery is obtained rapidly and at low cost.

It will finally be noted that various reset modes are compatible with the invention, notably by resonance, by an additional winding or by an active clamp.

The invention claimed is:

1. A device for balancing cells of a battery of an electric traction automobile vehicle, the device comprising:
   a primary winding disposed in series with a primary switch;
   for each cell a circuit comprising in series a secondary winding forming a transformer with the primary winding, a secondary switch, a coil, and a diode mounted in parallel with the coil and the cell;
   control circuitry to control the primary switch and each secondary switch; and
   a filter circuit disposed in series between the battery and the primary winding.

2. The device as claimed in claim 1, wherein the control circuitry is configured to generate pulse width modulation signals for the primary switch and for the secondary switches.

3. The device as claimed in claim 1, wherein the filter circuit includes a capacitor, a coil, and a diode.

4. The device as claimed in claim 1, wherein the primary switch and the secondary switches are MOSFETs.

5. The device as claimed in claim 4, wherein the secondary switches comprise two MOSFETs in anti-parallel.

6. A method of balancing cells of a battery of an electric traction automobile vehicle by a device comprising a primary winding disposed in series with a primary switch, for each cell, a circuit comprising in series a secondary winding forming a transformer with the primary winding, a secondary switch, a coil, and a diode mounted in parallel with the coil and the cell, and a filter circuit disposed in series between the battery and the primary winding, the method comprising:
   providing the device, each said circuit for the cells, and the filter circuit; and
   generating a pulse width modulation signal for the primary switch or for at least one secondary switch.

7. The method as claimed in claim 6, wherein the pulse width modulation signal is generated for the primary switch, and the secondary switch of at least one cell to be charged is closed.

8. The method as claimed in claim 6, wherein the pulse width modulation signal is generated for the secondary switch of at least one cell to be discharged, and the primary switch is closed.

* * * * *